US012334243B2

(12) United States Patent
Yen et al.

(10) Patent No.: US 12,334,243 B2
(45) Date of Patent: Jun. 17, 2025

(54) INDUCTOR DEVICE

(71) Applicant: Realtek Semiconductor Corporation, Hsinchu (TW)

(72) Inventors: Hsiao-Tsung Yen, Hsinchu (TW); Ting-Yao Huang, Hsinchu (TW); Ka-Un Chan, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 1127 days.

(21) Appl. No.: 17/205,291

(22) Filed: Mar. 18, 2021

(65) Prior Publication Data

US 2022/0084738 A1 Mar. 17, 2022

(30) Foreign Application Priority Data

Sep. 16, 2020 (TW) ................................ 109131842

(51) Int. Cl.
*H01F 27/28* (2006.01)
*H01F 27/29* (2006.01)

(52) U.S. Cl.
CPC ......... *H01F 27/2804* (2013.01); *H01F 27/29* (2013.01)

(58) Field of Classification Search
CPC ... H01F 27/2804; H01F 27/29; H01F 27/2823
See application file for complete search history.

(56) References Cited

U.S. PATENT DOCUMENTS 10,153,078 B2* 12/2018 Yen ......................... H01F 27/29
2007/0158782 A1* 7/2007 Heikkinen .......... H03F 3/45098 257/531
2012/0119845 A1* 5/2012 Lu ........................... H01F 21/12 333/26
2013/0257577 A1 10/2013 Nazarian
2017/0012601 A1* 1/2017 Yen ..................... H01L 23/5227
2018/0040413 A1* 2/2018 Yen ..................... H01F 27/2804
2019/0088734 A1* 3/2019 Yen ..................... H01L 23/5227
2019/0214175 A1* 7/2019 Yen .......................... H01F 41/06
2019/0221350 A1* 7/2019 Yen ..................... H01F 27/2804
2019/0279809 A1* 9/2019 Yen ..................... H01F 17/0006
2020/0312511 A1 10/2020 Yen et al.
2020/0312512 A1 10/2020 Yen et al.
2020/0312521 A1 10/2020 Yen et al.
2020/0312530 A1 10/2020 Yen et al.

FOREIGN PATENT DOCUMENTS

CN 106298190 A 1/2017
TW 201714278 A 4/2017
TW I591800 B 7/2017
TW I694475 B 5/2020
TW I703588 B 9/2020
TW I703591 B 9/2020
TW I703592 B 9/2020

* cited by examiner

*Primary Examiner* — Malcolm Barnes
(74) *Attorney, Agent, or Firm* — troutman pepper locke; Tim Tingkang Xia, Esq.

(57) ABSTRACT

An inductor device includes a first trace, a second trace, and at least one connection member. The first trace is disposed on a first area. The second trace is disposed on a second area. The first area and the second area are coupled to each other at a junction. The at least connection member is disposed at a block at which the first trace and the second trace are not disposed and which is adjacent to the junction, and the at least connection member is coupled to the first trace and the second trace.

20 Claims, 5 Drawing Sheets

INDUCTOR DEVICE

RELATED APPLICATIONS

This application claims priority to and the benefit of Taiwan Application Serial Number 109131842, filed on Sep. 16, 2020, the entire contents of which are incorporated herein by reference as if fully set forth below in its entirety and for all applicable purposes.

BACKGROUND

Field of Invention

The present disclosure relates to an electronic device. More particularly, the present disclosure relates to an inductor device.

Description of Related Art

The various types of inductors according to the prior art have their, advantages and disadvantages. For example, a spiral inductor has a higher Q value and a larger mutual inductance. However, its mutual inductance value and coupling are both occurred between the coils. For an eight-shaped inductor which has two sets of coils, the coupling between the two sets of coils is relatively low. However, an eight-shaped inductor occupies a larger area in a device. In addition, it is hard to design a twin inductor to be a symmetrical structure, which is formed with two inductors combined together, and the terminal of the twin inductor shall be disposed at a specific position. Therefore, the scopes of application of the above inductors are limited.

SUMMARY

The foregoing presents a simplified summary of the disclosure in order to provide a basic understanding to the reader. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

One aspect of the present disclosure is to provide an inductor device. The inductor device includes a first trace, a second trace, and at least one connection member. The first trace is disposed on a first area. The second trace is disposed on a second area. The first area and the second area are coupled to each other at a junction. The at least connection member is disposed at a block at which the first trace and the second trace are not disposed and which is adjacent to the junction, and the at least connection member is coupled to the first trace and the second trace.

Therefore, based on the technical content of the present disclosure, the structure of the inductor device can use empty blocks to dispose connection members efficiently so as to simplify connection structure in the inductor device, and the quality factor of the inductor device can be enhanced.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

According to the usual mode of operation, various features and elements in the figures have not been drawn to scale, which are drawn to the best way to present specific features and elements related to the disclosure. In addition, among the different figures, the same or similar element symbols refer to similar elements/components.

DESCRIPTION OF THE EMBODIMENTS

To make the contents of the present disclosure more thorough and complete, the following illustrative description is given with regard to the implementation aspects and embodiments of the present disclosure, which is not intended to limit the scope of the present disclosure. The features of the embodiments and the steps of the method and their sequences that constitute and implement the embodiments are described. However, other embodiments may be used to achieve the same or equivalent functions and step sequences.

Unless otherwise defined herein, scientific and technical terminologies employed in the present disclosure shall have the meanings that are commonly understood and used by one of ordinary skill in the art. Unless otherwise required by context, it will be understood that singular terms shall include plural forms of the same and plural terms shall include the singular. Specifically, as used herein and in the claims, the singular forms "a" and "an" include the plural reference unless the context clearly indicates otherwise.

Figure 1:
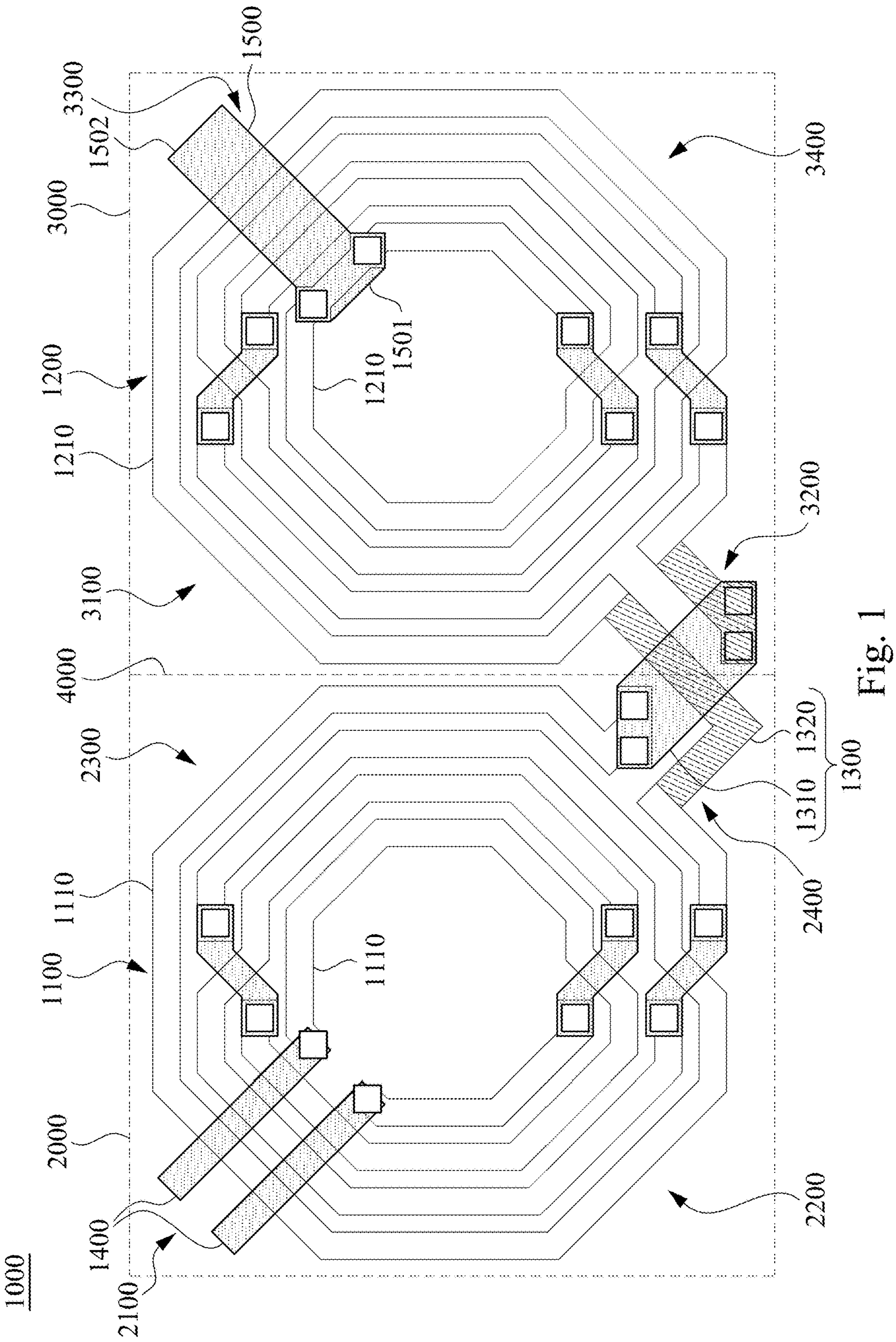
FIG. 1 depicts a schematic diagram of an inductor device according to one embodiment of the present disclosure.

FIG. 1 depicts a schematic diagram of an inductor device 1000 according to one embodiment of the present disclosure. As shown in the figure, the inductor device 1000 includes a first trace 1100, a second trace 1200, and at least one connection member 1300.

With respect to structure, the first trace 1100 is disposed on a first area 2000, and the second trace 1200 is disposed on a second area 3000. For example, the first trace 1100 is disposed on the left area in the figure, and the second trace 1200 is disposed on the right area in the figure.

In addition, the first area 2000 and the second area 3000 are coupled to each other at a junction 4000. The at least one connection member 1300 is disposed at a block at which the first trace 1100 and the second trace 1200 are not disposed, the block is adjacent to the junction 4000, and the at least one connection member 1300 is coupled to the first trace 1100 and the second trace 1200. For example, the first trace 1100 and the second trace 1200 are all octangle traces. Therefore, an upper left block 2100, a lower left block 2200, an upper right block 2300, and a lower right block 2400 of the first area 2000 do not have any first trace 1100 disposed therein. In other words, the blocks are empty blocks. Similarly, an upper left block 3100, a lower left block 3200, an upper right block 3300, and a lower right block 3400 of the second area 3000 do not have any second trace 1200 disposed therein, and the blocks are empty blocks as well. The empty blocks of the inductor device 1000 of the present disclosure are used to dispose the at least one connection member 1300 so as to connect the first trace 1100 and the second trace 1200. However, the present disclosure is not limited to the foregoing embodiments in FIG. 1, the type of the first trace 1100 and the second trace 1200 can be set to be other type, for example, diamond, depending on actual requirement. Since there are empty blocks around a diamond trace, the at least one connection member 1300 can be disposed at the empty blocks as well.

In one embodiment, the at least one connection member 1300 includes a connection member 1310 and a connection member 1320. The connection member 1320 is located on the first layer and coupled to the first trace 1100 and the second trace 1200. The connection member 1310 is located on the second layer and crosses the connection member 1320, and the connection member 1310 together with the connection member 1320 form a crossing structure. In another embodiment, the first trace 1100 and the second trace 1200 are located on the first layer, and the connection member 1310 is located on the second layer. In another embodiment, the first layer is different from the second layer.

In some embodiments, the first trace 1100 includes a plurality of first wires 1110. In addition, the second trace 1200 includes a plurality of second wires 1210.

In one embodiment, the inductor device 1000 further includes an input/output member 1400. The input/output member 1400 is coupled to the first wire 1110 which is located at an innermost side among multiple first wires 1110. In another embodiment, the first wire 1110 is located on the first layer, and the input/output member 1400 is located on the second layer. The first wire 1110 and the input/output member 1400 are coupled to each other through vias.

In some embodiments, the input/output member 1400 includes a first terminal and a second terminal. The first terminal (e.g., the lower terminal as shown in the figure) of the input/output member 1400 is coupled to the first wire 1110 which is located at an innermost side among multiple first wires 1110. The second terminal (e.g., the upper terminal as shown in the figure) of the input/output member 1400 is disposed at a side which is opposite to the junction 4000, and located at a block at which the first trace 1100 and the second trace 1200 are not disposed. For example, the upper terminal of the input/output member 1400 is disposed at the left side which is opposite to the junction 4000 formed between the first area 2000 and the second area 3000, and the upper terminal of the input/output member 1400 is located at the upper left block 2100 at which the first trace 1100 and the second trace 1200 are not disposed, wherein the upper left block 2100 is located at the upper left corner of the first area 2000.

In one embodiment, the inductor device 1000 further includes a center-tapped member 1500. The center-tapped member 1500 is coupled to the second wire 1210 which is located at an innermost side among multiple second wires 1210. In another embodiment, the second wire 1210 is located on the first layer, and the center-tapped member 1500 is located on the second layer. The second wire 1210 and the center-tapped member 1500 are coupled to each other through vias.

In some embodiments, the center-tapped member 1500 includes a first terminal 1501 and a second terminal 1502. The first terminal 1501 (e.g., the lower terminal as shown in the figure) of the center-tapped member 1500 is coupled to the second wire 1210 which is located at an innermost side among multiple second wires 1210. The second terminal 1502 (e.g., the upper terminal as shown in the figure) of the center-tapped member 1500 is disposed at a side which is opposite to the junction 4000, and located at a block at which the first trace 1100 and the second trace 1200 are not disposed. For example, the upper terminal of the center-tapped member 1500 is disposed at the right side which is opposite to the junction 4000 formed between the first area 2000 and the second area 3000, and the upper terminal of the center-tapped member 1500 is located at the upper right block 3300 at which the first trace 1100 and the second trace 1200 are not disposed, wherein the upper right block 3300 is located at the upper right corner of the second area 3000.

Figure 5:
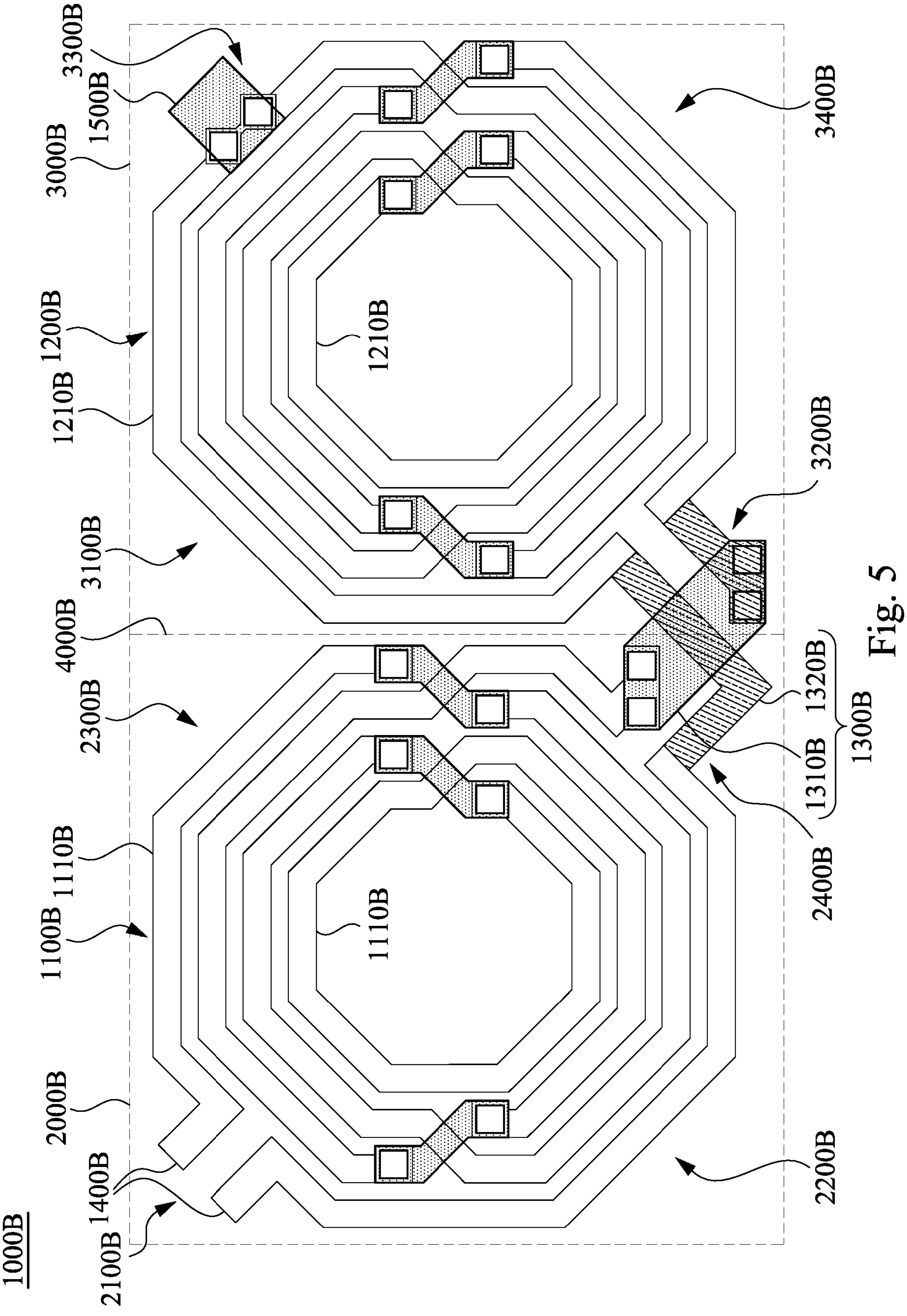
FIG. 5 depicts a schematic diagram of an inductor device according to one embodiment of the present disclosure.

In one embodiment, multiple first wires 1110 and multiple second wires 1210 are coupled to each other at a first side (e.g., the upper side) and a second side (e.g., the lower side) of the inductor device 1000 in an interlaced manner, or multiple first wires 1110 and multiple second wires 1210 are coupled to each other at a third side (e.g., the left side) and a fourth side (e.g., the right side) of the inductor device 1000 in an interlaced manner (this feature will be illustrated in the following FIG. 5). In another embodiment, the first side and the second side are located at a first direction (e.g., a perpendicular direction in the figure), the third side and the fourth side are located at a second direction (e.g., a horizontal direction in the figure), and the first direction is perpendicular to the second direction. However, the present disclosure is not limited to the structure as shown in FIG. 1, and it is merely an example for illustrating one of the implements of the present disclosure.

Figure 2:
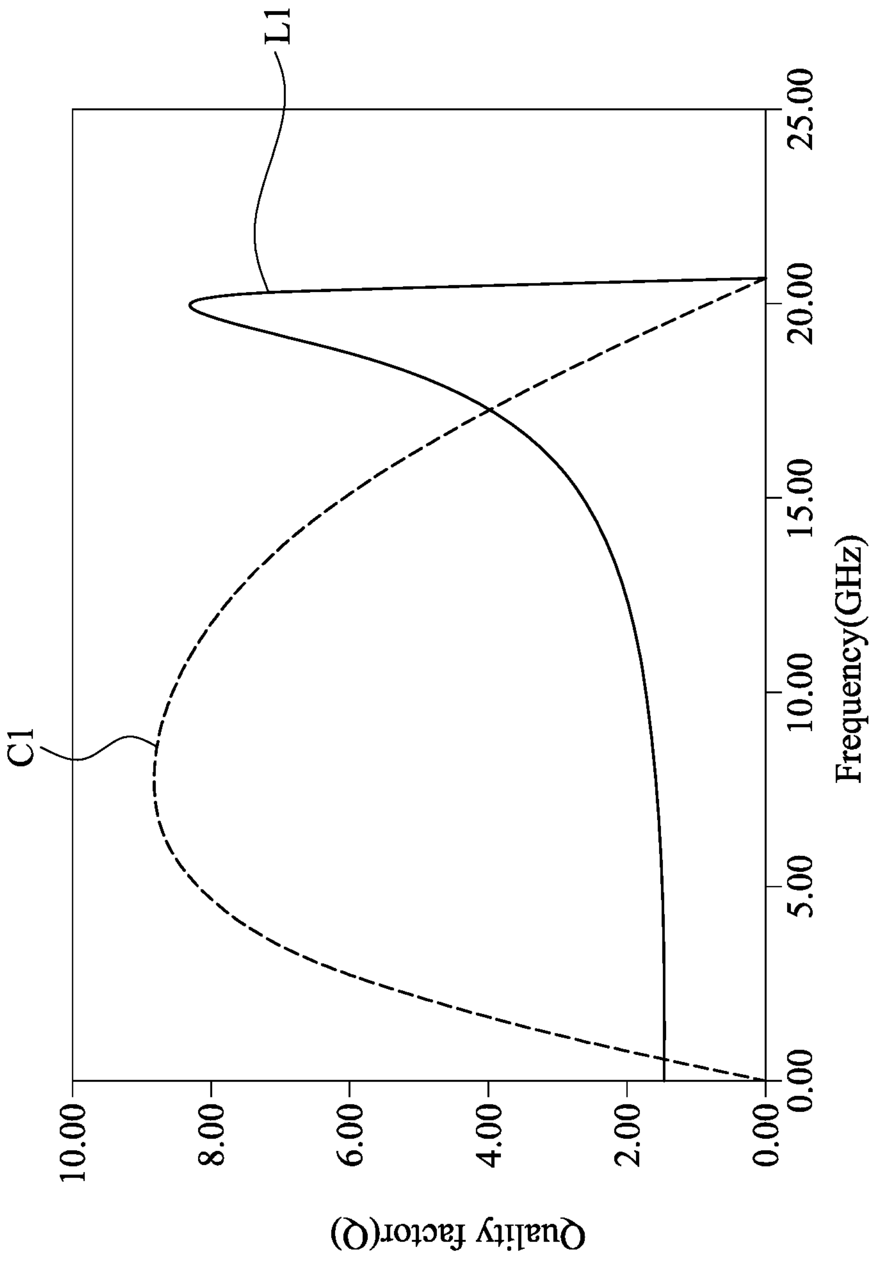
FIG. 2 depicts a schematic diagram of experimental data of an inductor device according to one embodiment of the present disclosure.

FIG. 2 depicts a schematic diagram of experimental data of the inductor device 1000 as shown in FIG. 1 according to one embodiment of the present disclosure. As shown in the figure, the experimental curve of the quality factor of the inductor device adopting the structural configuration of the present disclosure is C1, and the experimental curve of the inductance value of the inductor device is L1. As can be seen from the figure, the inductor device 1000 adopting the structure of the present disclosure has better quality factor. For example, at a frequency of about 5 GHz, the quality factor of the inductor device 1000 is about 8.2. In one embodiment, the size of the inductor device 1000 of the present disclosure is 130 μm×64 μm, the width of the inductor device 1000 is 3 μm, and the spacing of the inductor device 1000 is 2 μm. However, the present disclosure is not limited to the structure as shown in FIG. 2, and it is merely an example for illustrating one of the implements of the present disclosure.

Figure 3:
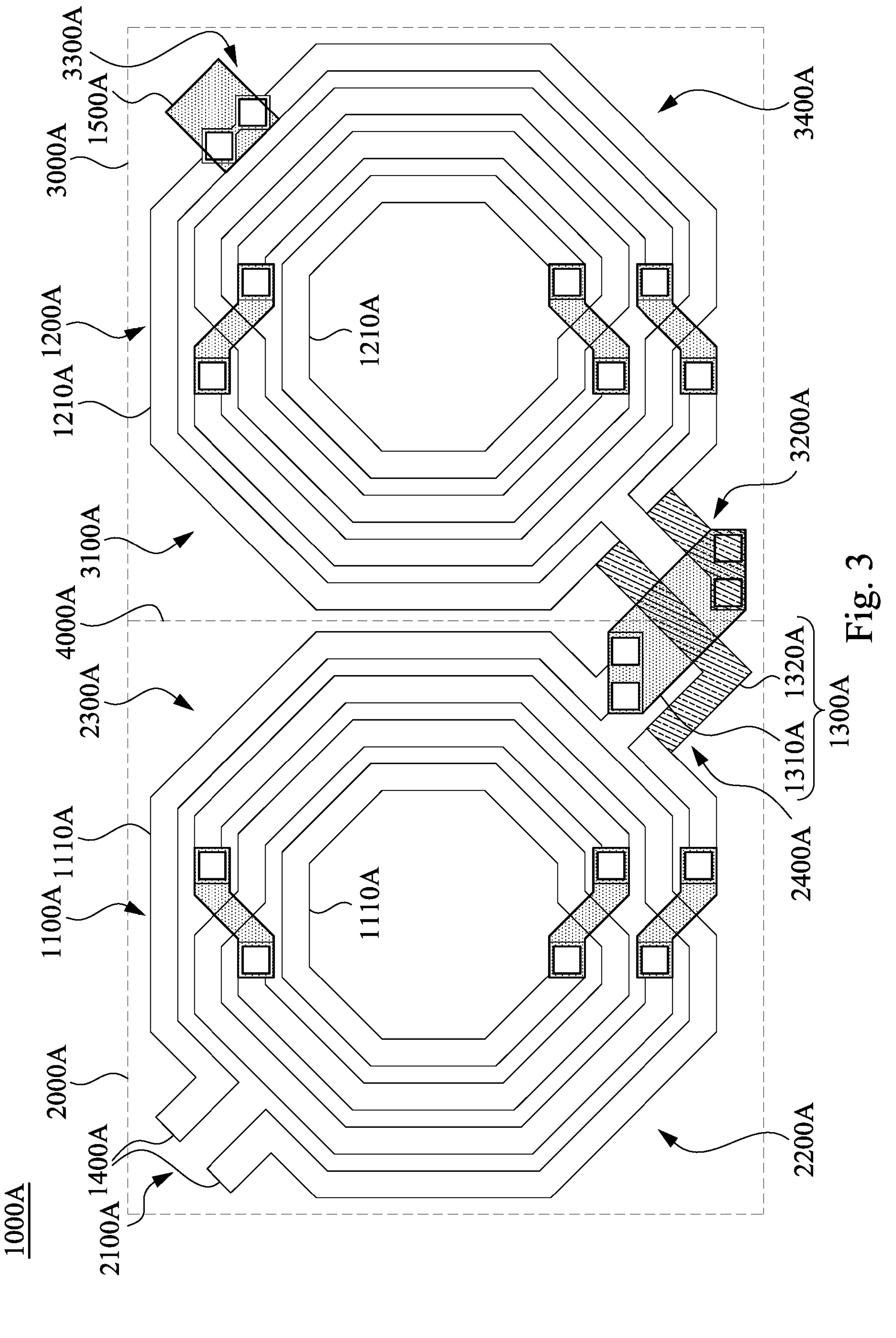
FIG. 3 depicts a schematic diagram of an inductor device according to one embodiment of the present disclosure.

FIG. 3 depicts a schematic diagram of an inductor device according to one embodiment of the present disclosure. Compared with the input/output member 1400 of the inductor device 1000 in FIG. 1, the disposition of the input/output terminal 1400A of the inductor device 1000A in FIG. 3 is different. As shown in the figure, the input/output terminal 1400A is coupled to the first wire 1110A which is located at an outermost side among multiple first wires 1110A. In another embodiment, the first wire 1110A and the input/output terminal 1400A are located on the same layer.

In some embodiments, the input/output terminal 1400A includes a first terminal and a second terminal. The first terminal (e.g., the lower terminal as shown in the figure) of the input/output terminal 1400A is coupled to the first wire 1110 which is located at an outermost side among multiple first wires 1110. The second terminal (e.g., the upper terminal as shown in the figure) of the input/output terminal 1400A is disposed at a side which is opposite to the junction 4000A, and located at a block at which the first trace 1100A and the second trace 1200A are not disposed. For example, the upper terminal of the input/output member 1400A is disposed at the left side which is opposite to the junction 4000A formed between the first area 2000A and the second area 3000A, and the upper terminal of the input/output member 1400A is located at the upper left block 2100A at which the first trace 1100A and the second trace 1200A are not disposed, wherein the upper left block 2100A is located at the upper left corner of the first area 2000A.

In one embodiment, compared with the center-tapped member 1500 of the inductor device 1000 in FIG. 1, the disposition of the center-tapped member 1500A of the inductor device 1000A in FIG. 3 is different. As shown in the figure, the center-tapped member 1500A is coupled to the second wire 1210A which is located at an outermost side among multiple second wires 1210A. In another embodiment, the second wire 1210A is located on the first layer, and the center-tapped member 1500A is located on the second layer. The second wire 1210A and the center-tapped member 1500A are coupled to each other through vias.

In some embodiments, the center-tapped member 1500A includes a first terminal and a second terminal. The first terminal (e.g., the lower terminal as shown in the figure) of the center-tapped member 1500A is coupled to the second wire 1210A which is located at an outermost side among multiple second wires 1210A. The second terminal (e.g., the upper terminal as shown in the figure) of the center-tapped member 1500A is disposed at a side which is opposite to the junction 4000A, and located at a block at which the first trace 1100A and the second trace 1200A are not disposed. For example, the upper terminal of the center-tapped member 1500A is disposed at the right side which is opposite to the junction 4000A formed between the first area 2000A and the second area 3000A, and the upper terminal of the center-tapped member 1500A is located at the upper right block 3300A at which the first trace 1100A and the second trace 1200A are not disposed, wherein the upper right block 3300A is located at the upper right corner of the second area 3000A.

In one embodiment, multiple first wires 1110A and multiple second wires 1210A are coupled to each other at a first side (e.g., the upper side) and a second side (e.g., the lower side) of the inductor device 1000A in an interlaced manner, or multiple first wires 1110A and multiple second wires 1210A are coupled to each other at a third side (e.g., the left side) and a fourth side (e.g., the right side) of the inductor device 1000A in an interlaced manner (this feature will be illustrated in the following FIG. 5). In another embodiment, the first side and the second side are located at a first direction (e.g., a perpendicular direction in the figure), the third side and the fourth side are located at a second direction (e.g., a horizontal direction in the figure), and the first direction is perpendicular to the second direction. It is noted that, the element in FIG. 3, whose symbol is similar to the symbol of the element in FIG. 1, has similar structure feature in connection with the element in FIG. 1. Therefore, a detail description regarding the structure feature of the element in FIG. 3 is omitted herein for the sake of brevity. Furthermore, the present disclosure is not limited to the structure as shown in FIG. 3, and it is merely an example for illustrating one of the implements of the present disclosure.

Figure 4:
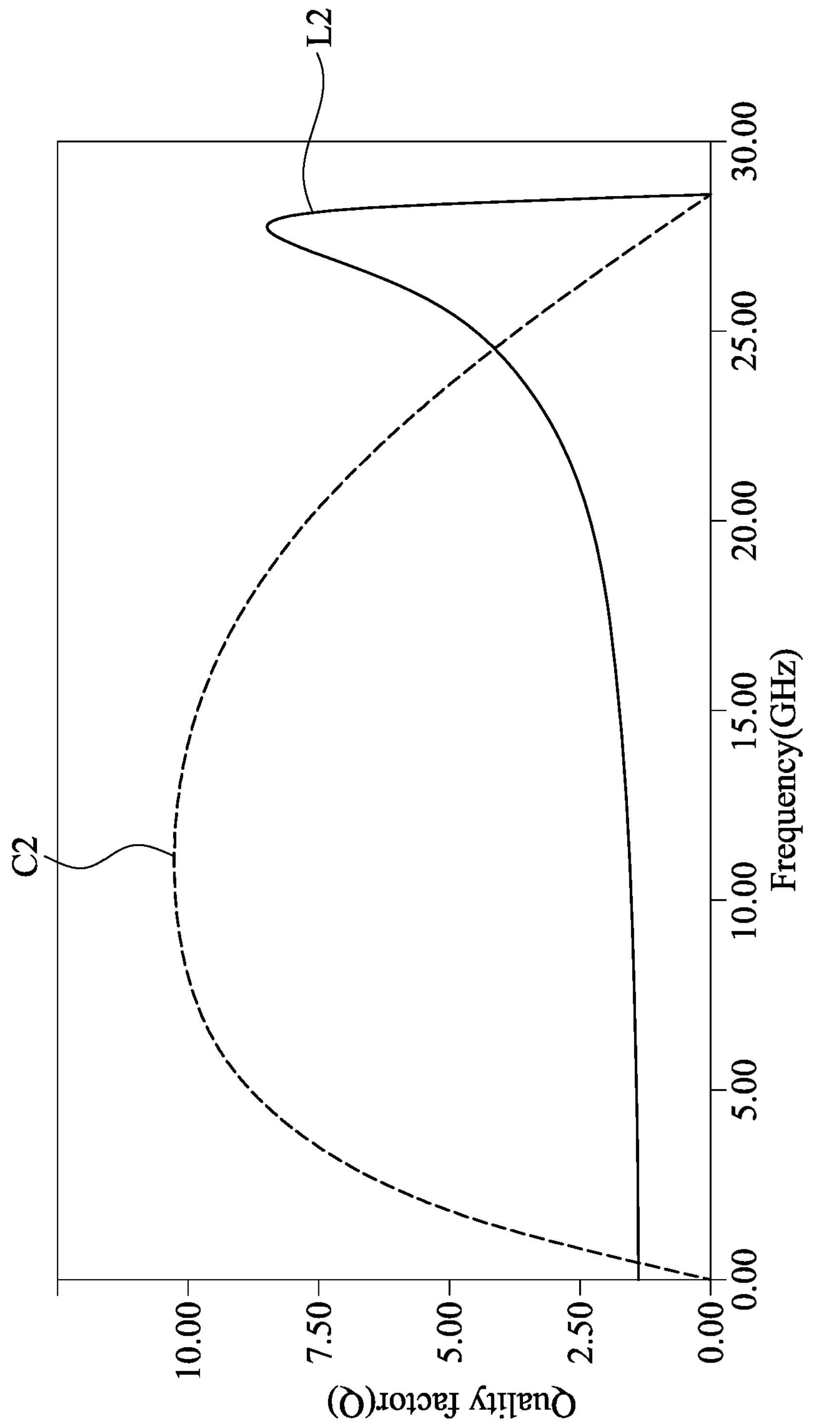
FIG. 4 depicts a schematic diagram of experimental data of an inductor device according to one embodiment of the present disclosure.

FIG. 4 depicts a schematic diagram of experimental data of the inductor device 1000A as shown in FIG. 3 according to one embodiment of the present disclosure. As shown in the figure, the experimental curve of the quality factor of the inductor device adopting the structural configuration of the present disclosure is C2, and the experimental curve of the inductance value of the inductor device is L2. As can be seen from the figure, the inductor device 1000A adopting the structure of the present disclosure has better quality factor. For example, at a frequency of about 5 GHz, the quality factor of the inductor device 1000A is about 8.8. In one embodiment, the size of the inductor device 1000A of the present disclosure is 130 μm×64 μm, the width of the inductor device 1000A is 3 μm, and the spacing of the inductor device 1000A is 2 μm. However, the present disclosure is not limited to the structure as shown in FIG. 4, and it is merely an example for illustrating one of the implements of the present disclosure.

FIG. 5 depicts a schematic diagram of an inductor device according to one embodiment of the present disclosure. Compared with the inductor device 1000A as shown in FIG. 3, the disposition of the first wire 11108 and the second wire 1210B of the inductor device 1000B in FIG. 5 is different. As shown in the figure, multiple first wires 11108 and multiple second wires 1210B are coupled to each other at a third side (e.g., the left side) and a fourth side (e.g., the right side) of the inductor device 1000B in an interlaced manner. In another embodiment, the first side and the second side of the inductor device 1000B are located at a first direction (e.g., a perpendicular direction in the figure), the third side and the fourth side of the inductor device 1000B are located at a second direction (e.g., a horizontal direction in the figure), and the first direction is perpendicular to the second direction. It is noted that, the element in FIG. 5, whose symbol is similar to the symbol of the element in FIG. 1, has similar structure feature in connection with the element in FIG. 1. Therefore, a detail description regarding the structure feature of the element in FIG. 5 is omitted herein for the sake of brevity. Furthermore, the present disclosure is not limited to the structure as shown in FIG. 5, and it is merely an example for illustrating one of the implements of the present disclosure.

It can be understood from the embodiments of the present disclosure that application of the present disclosure has the following advantages. The structure of the inductor device can use empty blocks to dispose connection members efficiently so as to simplify connection structure in the inductor device, and the quality factor of the inductor device can be enhanced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inductor device, comprising:

a first trace, disposed on a first area;

a second trace, disposed on a second area, wherein the first area and the second area are coupled to each other at a junction; and at least one connection member, disposed at a block at which the first trace and the second trace are not disposed and which is adjacent to the junction, wherein the at least one connection member is coupled to the first trace and the second trace, wherein the junction is a virtual line, wherein the at least one connection member is not located in a closest interval between the first trace and the second trace.

2. The inductor device of claim 1, wherein the first trace and the second trace are located on a first layer, and the at least one connection member is located on a second layer.

3. The inductor device of claim 2, wherein the first layer is different from the second layer.

4. The inductor device of claim 3, wherein the first trace comprises a plurality of first wires.

5. The inductor device of claim 4, wherein the second trace comprises a plurality of second wires.

6. The inductor device of claim 5, further comprising:

an input/output member, coupled to the first wire which is located at an innermost side among the first wires.

7. The inductor device of claim 6, wherein the input/output member is located on the second layer.

8. The inductor device of claim 7, wherein the input/output member comprises:

a first terminal, coupled to the first wire which is located at an innermost side among the first wires; and a second terminal, disposed at a side which is opposite to the junction, and located at a block at which the first trace and the second trace are not disposed.

9. The inductor device of claim 8, further comprising:

a center-tapped member, coupled to the second wire which is located at an innermost side among the second wires.

10. The inductor device of claim 9, wherein the center-tapped member is located on the second layer.

11. The inductor device of claim 10, wherein the center-tapped member comprises:

a first terminal, coupled to the second wire which is located at an innermost side among the second wires; and a second terminal, disposed at a side which is opposite to the junction, and located at a block at which the first trace and the second trace are not disposed.

12. The inductor device of claim 11, wherein the first wires and the second wires are coupled to each other at a first side and a second side of the inductor device in an interlaced manner, or the first wires and the second wires are coupled to each other at a third side and a fourth side of the inductor device in an interlaced manner.

13. The inductor device of claim 12, wherein the first side and the second side are located at a first direction, the third side and the fourth side are located at a second direction, and the first direction is perpendicular to the second direction.

14. The inductor device of claim 5, further comprising:

an input/output member, coupled to the first wire which is located at an outermost side among the first wires.

15. The inductor device of claim 14, wherein the input/output member comprises:

a first terminal, coupled to the first wire which is located at an outermost side among the first wires; and a second terminal, disposed at a side which is opposite to the junction, and located at a block at which the first trace and the second trace are not disposed.

16. The inductor device of claim 15, further comprising:

a center-tapped member, coupled to the second wire which is located at an outermost side among the second wires.

17. The inductor device of claim 16, wherein the center-tapped member is located on the second layer.

18. The inductor device of claim 17, wherein the center-tapped member comprises:

a first terminal, coupled to the second wire which is located at an outermost side among the second wires; and a second terminal, disposed at a side which is opposite to the junction, and located at a block at which the first trace and the second trace are not disposed.

19. The inductor device of claim 18, wherein the first wires and the second wires are coupled to each other at a first side and a second side of the inductor device in an interlaced manner, or the first wires and the second wires are coupled to each other at a third side and a fourth side of the inductor device in an interlaced manner.

20. The inductor device of claim 19, wherein the first side and the second side are located at a first direction, the third side and the fourth side are located at a second direction, and the first direction is perpendicular to the second direction.

* * * * *